Figure 1:
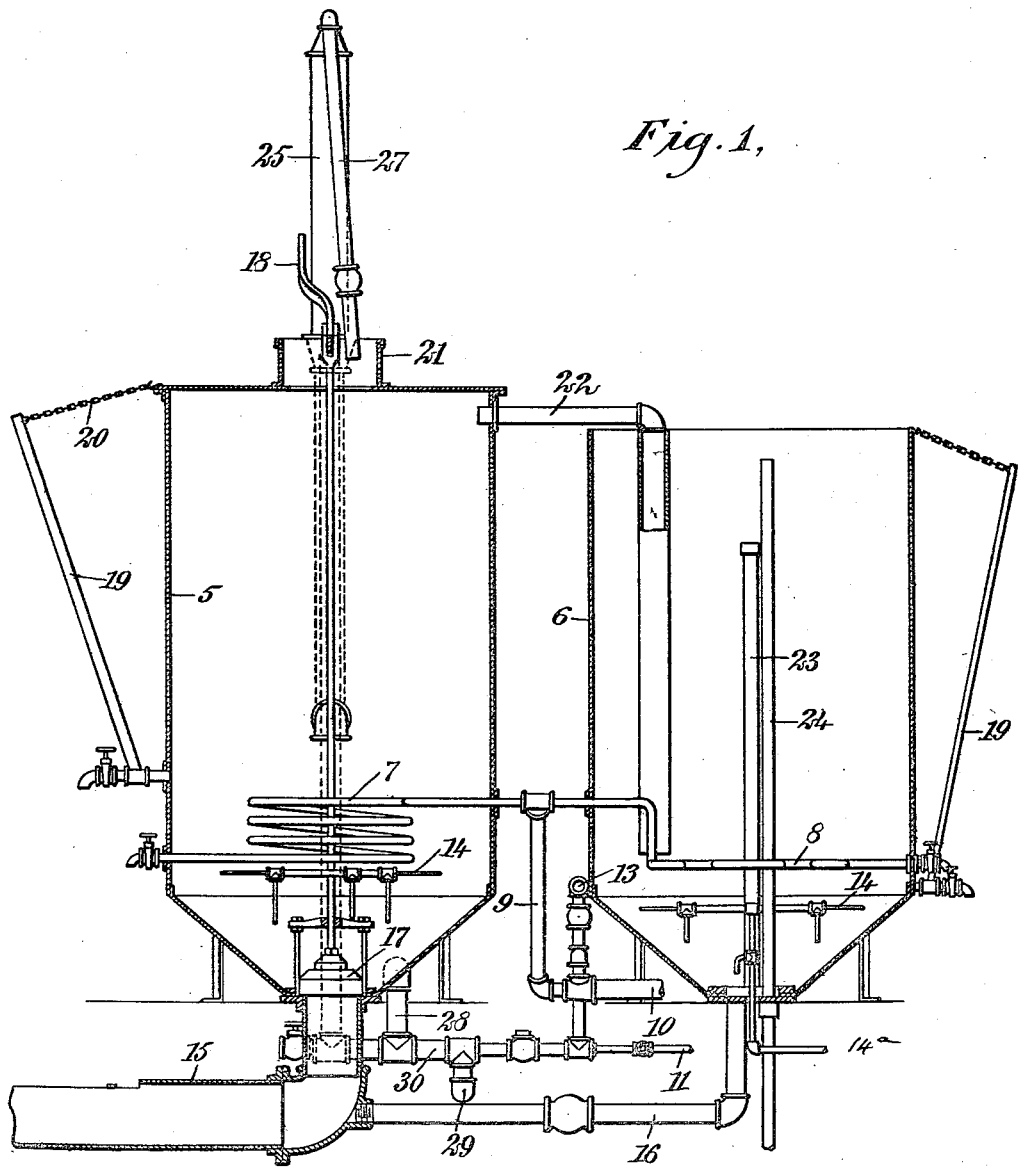

L. W. BROWN, DEC'D.
G. F. BROWN & D. L. B. CONDON, EXECUTORS.
PROCESS OF BREAKING UP AND SEPARATING THE GASEOUS LIQUID AND SOLID CONSTITUENTS OF CRUDE PETROLEUM.
APPLICATION FILED AUG. 24, 1908.

994,100.

Patented May 30, 1911.

3 SHEETS—SHEET 1.

WITNESSES
Edward Thorpe

INVENTOR
Linus W. Brown
BY
ATTORNEYS

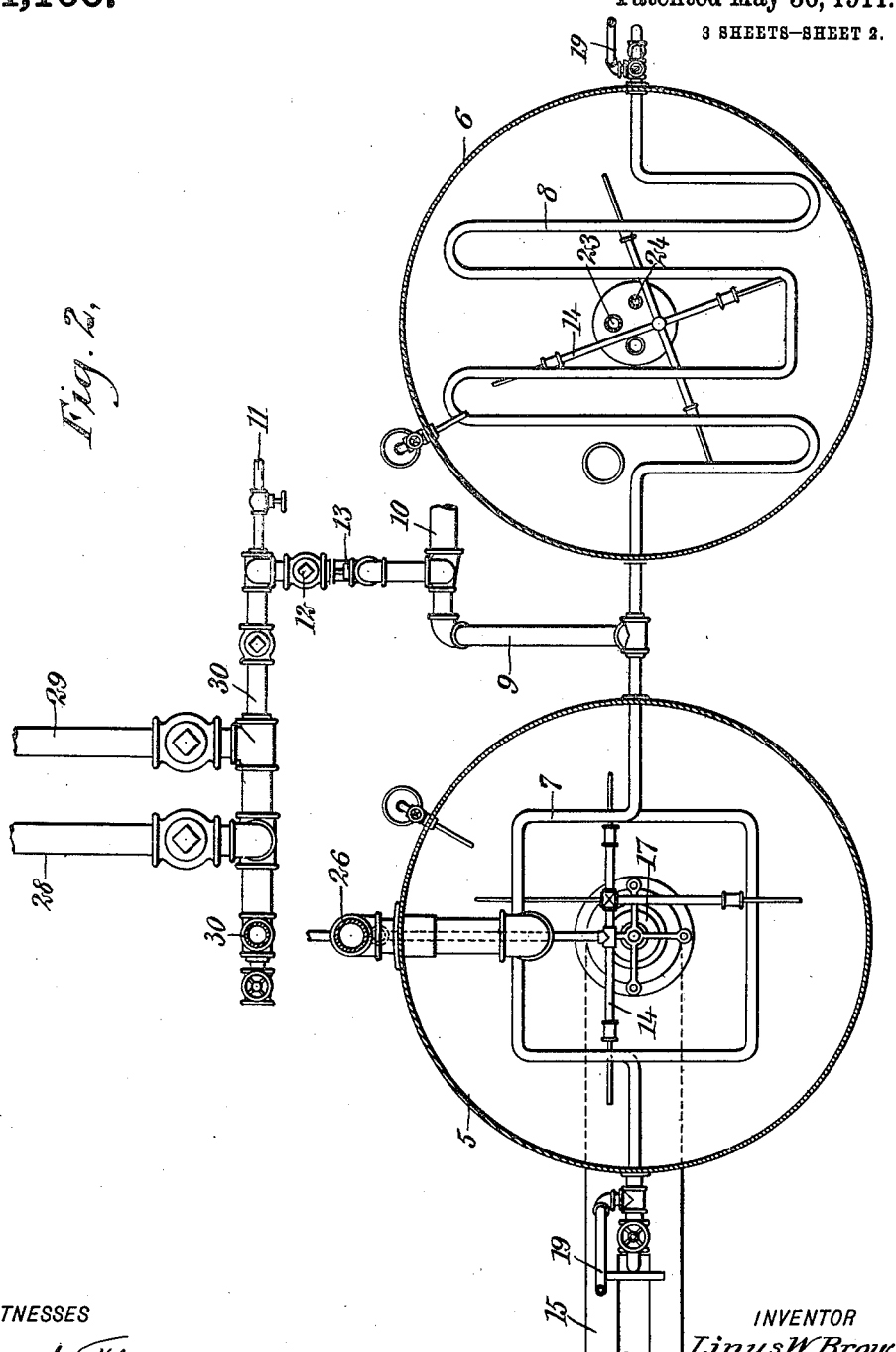

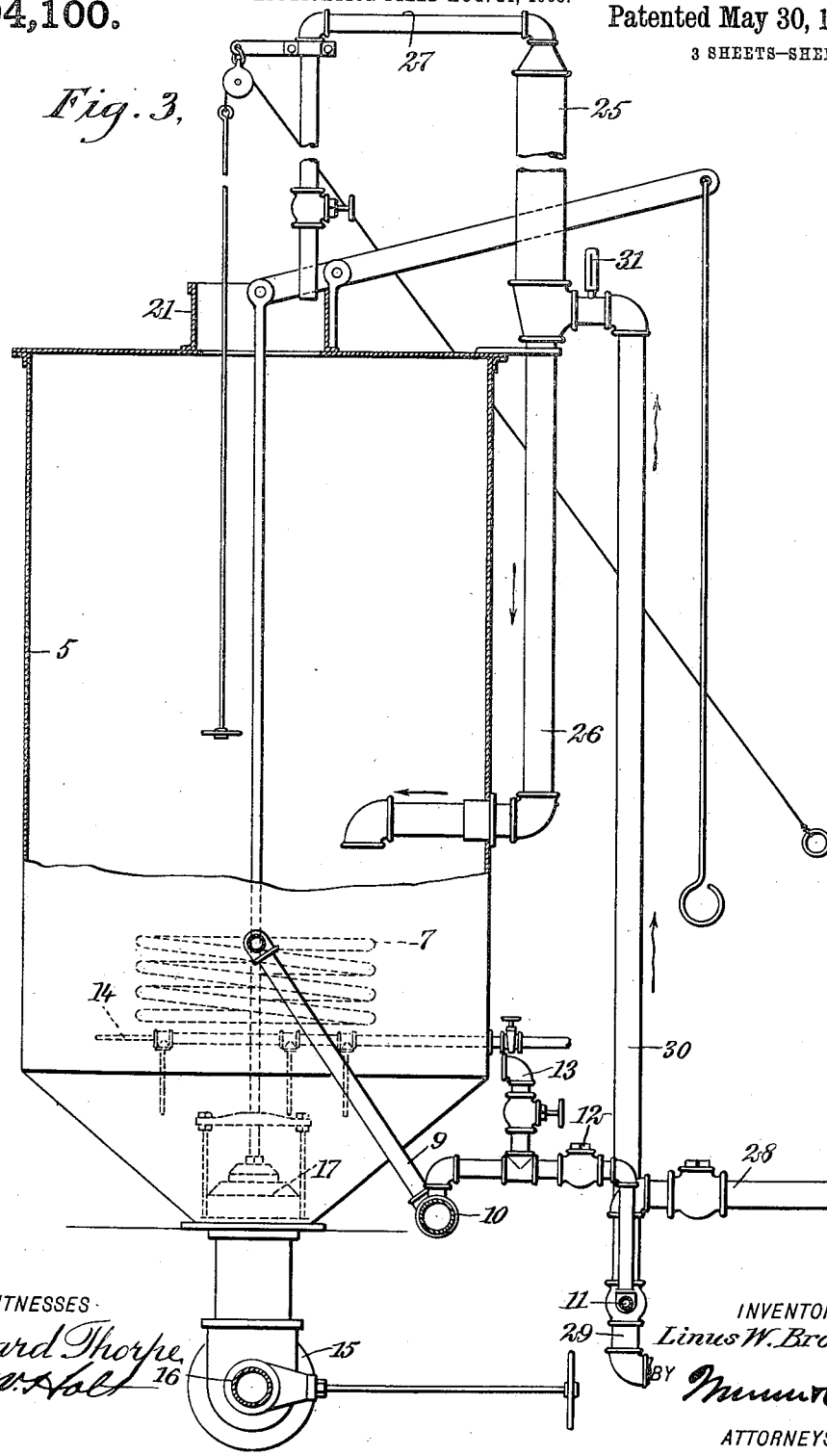

UNITED STATES PATENT OFFICE.

LINUS W. BROWN, OF MONROVIA, CALIFORNIA; GEORGE FRANCIS BROWN AND DAISY LUCRETIA BROWN CONDON EXECUTORS OF SAID LINUS W. BROWN, DECEASED.

PROCESS OF BREAKING UP AND SEPARATING THE GASEOUS LIQUID AND SOLID CONSTITUENTS OF CRUDE PETROLEUM.

994,100.  Specification of Letters Patent.  Patented May 30, 1911.

Application filed August 24, 1908. Serial No. 449,985.

*To all whom it may concern:*

Be it known that I, LINUS W. BROWN, a citizen of the United States, and a resident of Monrovia, in the county of Los Angeles and State of California, have invented a new and Improved Process of Breaking up and Separating the Gaseous Liquid and Solid Constituents of Crude Petroleum, of which the following is a full, clear, and exact description.

Crude petroleum, more especially that delivered from the oil wells in the State of California, is a thick, mucky, viscous, spongy, sludge-like substance containing fixed gases, sand, water, asphaltene, clays, and other minerals in complete and perfect emulsion with the oil, which emulsion is the result of long periods of confinement under extraordinary heat, pressure and chemical conditions. The ordinary practice has been to place the crude product in sumps constructed in the ground, having large area, and allow atmospheric contact to gradually and slowly produce a separation, which method is not only slow and imperfect but very wasteful. As an illustration of this wastefulness, if an open pail be filled with crude petroleum and allowed to stand for about a day, only the very heaviest and largest particles of sand, etc., will be precipitated, and the finer particles of clay, sand and other solid matter will not be precipitated for a much longer time, depending upon its fineness and the specific gravity. If this pail of crude petroleum be subjected to heat it will produce a large volume of foam by the expansion of the gases, and the heat will not break up the emulsion, and while heat makes the oil more limpid and assists the small particles to precipitate, it does not effect the separation of the emulsion into its gaseous, liquid and solid constituents. I have discovered that if a current of steam be brought into contact with this crude petroleum in a vessel or conduit directly the fluid is pumped from the ground, an agitation is produced which positively and thoroughly breaks up the emulsion, placing it in a condition in which the fixed gases, water, clay, asphaltene and such like ingredients will readily separate when quiescent, and will not re-mix. The conclusion that the action of the steam on the crude oil is purely mechanical, is arrived at for the reason that the contact produces no chemical action or change, the action being precisely analogous to the mechanical motion required for separating butter from cream. I have applied my discovery to several crude oil separators in practical operation and find in each instance that my theory is confirmed.

Reference is to be had to the accompanying drawings forming a part of this specification, in which similar characters of reference indicate corresponding parts in all the views.

Figure 1 is a central vertical section of an oil cleaning apparatus which I preferably use in carrying out my improved process; Fig. 2 is a horizontal section of the same; Fig. 3 is a vertical section taken between the two principal tanks of the apparatus.

A separating tank 5 and a flow tank 6 are placed conveniently close together and provided with steam coils 7 and 8 respectively near their bottoms, which are supplied with exhaust steam through a common pipe 9, the pipe 9 receiving the exhaust steam through a pipe 10, from the engine operating the oil well, and the live steam through a pipe 11, a valve 12 being provided in the pipe 9 between the pipes 10 and 11 and also a blow-off connection 13. Both the tanks 5 and 6 have radially and downwardly directed water delivery nozzles 14 for washing out the accumulations of sediment through pipes 15 and 16 respectively, the nozzle being supplied by a pipe 14ª, see Fig. 1. The outlet of the pipe 15, which I preferably term the sand sluice, is controlled by a valve 17 which is actuated by a suitable lever 18 arranged at the outside of the tank. The water in the two tanks is automatically maintained at levels slightly above the heating coils 7 and 8, by water regulators, each of which consists of a communicating pipe 19 pivotally supported at the side of the tank and held in adjusted position by a suitable connection 20.

At the top of the separating tank 5 is an expansion tank 21, as also a flow pipe 22 which leads the oil at the surface of the separating tank into the flow tank below the normal level of the water therein. The flow tank is provided with a pump suction pipe 23 and an overflow pipe 24 vertically arranged therein and open at the top, the overflow pipe extending above the suction pipe.

The construction so far described and its operation are in substance the same as that disclosed in my co-pending application entitled "Oil and sand separator," serially numbered 435,705. The present apparatus, however, differs from the above construction in that an initial receiving or gas separating tank or receptacle 25 is arranged at an elevation above the separating tank and has a connection at its lower end with a pipe 26 leading into the separating tank, and a pipe 27 leading from its upper end over the expansion tank 21. The receiving or gas separating tank 25 is in effect no more than an expanded or enlarged portion of the pipe 26.

Pipes 28 and 29 lead respectively from the oil well nearest the separator and from wells at farther distances, and connect with a pipe 30, in which pipe 30 the oil comes in contact with the steam, either live or exhaust; live steam is admitted through pipe 11, and the exhaust steam from the engine operating oil well, through pipe 10 and connections as shown; in the event that there is more exhaust steam than required, the surplus is allowed to escape to the atmosphere at the opening 13. The valve 12 is to close off the exhaust steam from the pipe 30, if desired. The pipe 30 leads to the bottom of the receiving or gas separating tank 25, at which point it is preferably provided with a thermometer 31, serving to indicate the temperature of the crude petroleum and steam when ejected at this point. When the petroleum and steam reach the receiving or gas separating tank, the breaking up of the emulsion is complete in the manner before described, and the gases and uncondensed vapor pass to the top of the receiving tank and flow through the pipe 27, escaping to the atmosphere, at which point any entrained oil drops through the expansion tank into the separating tank. The oil, sand, etc., falls through the pipe 26 into the separating tank where a semi-quiescent condition is provided and the segregation rapidly takes place. The separated oil passes through the flow pipe 22 into the flow tank, where it is drawn off by the pump suction pipe 23, as in the apparatus in my co-pending application referred to.

Having thus described my invention, I claim as new and desire to secure by Letters Patent:

The described process of treating the species of crude petroleum obtained from oil wells in the State of California, for the purpose of separating the solid liquid and gaseous constituents from the oil proper, which consists in passing the crude oil in its emulsified condition along with steam through a common conduit, whereby they are thoroughly intermingled and the emulsion is broken up, and then allowing the steam and other gases to escape and discharging the solid and liquid products into a hot-water tank wherein the elements are completely segregated, as described.

In testimony whereof I have signed my name to this specification in the presence of two subscribing witnesses.

LINUS W. BROWN.

Witnesses:
CARROLL F. NEW,
M. E. DARROW.